United States Patent
Nakahira

(10) Patent No.: US 6,671,254 B1
(45) Date of Patent: Dec. 30, 2003

(54) COMMUNICATION NETWORK AND COMMUNICATION NODE USED IN SUCH NETWORK

(75) Inventor: Yoshihiro Nakahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/457,761

(22) Filed: Dec. 10, 1999

(30) Foreign Application Priority Data

Dec. 11, 1998 (JP) .......................................... 10-353058

(51) Int. Cl.[7] ............................................... H04J 14/00
(52) U.S. Cl. .......................... 370/229; 370/232; 398/5; 398/25
(58) Field of Search ................................ 370/217, 229, 370/232, 392; 359/110, 118, 123, 124, 135, 139; 398/5, 25, 45, 82, 175

(56) References Cited

U.S. PATENT DOCUMENTS

| | | | | |
|---|---|---|---|---|
| RE36,471 E | * | 12/1999 | Cohen ......................... | 359/110 |
| 6,075,630 A | * | 6/2000 | Nishio .......................... | 398/25 |
| 6,111,673 A | * | 8/2000 | Chang et al. ................. | 370/392 |
| 6,404,525 B1 | * | 6/2002 | Shimomura et al. .......... | 398/82 |
| 6,407,834 B1 | * | 6/2002 | Takeshita et al. ............ | 398/175 |
| 6,504,817 B2 | * | 1/2003 | Oldfield et al. .............. | 370/217 |
| 6,559,984 B1 | * | 5/2003 | Lee et al. ....................... | 398/5 |
| 6,570,684 B1 | * | 5/2003 | Stone et al. ................... | 398/45 |

\* cited by examiner

*Primary Examiner*—Salvatore Cangialosi
(74) *Attorney, Agent, or Firm*—Venable LLP; Michael A. Sartori

(57) ABSTRACT

A network system comprises nodes, a network management system and a plurality of user terminals. Each of the nodes established on the network system comprises an optical cross connect and a packet switch. The packet switch accommodates a plurality of terminals. Each of the nodes monitors traffic transferring in the packet switch thereof. Alternatively, each of the nodes monitors start and end of an application of each of the terminals included therein. Alternatively, each of the nodes measures delay time between the nodes. Then, each of the nodes reports the packet flow, the start and the end of the application, or the delay time between nodes to the network management system. The network management system establishes an optical path between each of the nodes based on the packet flow, the start and the end of the application, or the delay time between nodes monitored by each of the nodes.

37 Claims, 12 Drawing Sheets

COMMUNICATION NETWORK AND COMMUNICATION NODE USED IN SUCH NETWORK

FIELD OF THE INVENTION

This invention relates to a network system, in particular to a communication node included in such network system.

BACKGROUND OF THE INVENTION

A communication network system is composed of a plurality of nodes and links connecting these nodes. Typically, the node includes, for example, an electronic exchanger EX or a router. Moreover, the node includes a cross connect. With a recent increase in data traffic, an optical cross connect handling optical signals has been developed. FIG. 1 shows a typical structure of a communication network system using the optical cross connect.

In FIG. 1, a network in which a plurality of nodes, node A to node D, is cross-connected by optical fibers is shown. In each of the nodes, an electronic exchanger EX is connected with an optical cross connect OXC. Each of the electronic exchangers EX accommodates a plurality of user terminals.

The electronic exchanger EX comprises a switch SW and a switch controller. The electronic exchanger EX changes a data input from the user terminal and outputs it to the optical cross connect OXC. At this time, if the plurality of terminals are outputting data to a single node, the data from the plurality of terminals are time division multiplexed to one electric signal to be output to an input port of the optical cross connect OXC.

The optical cross connect OXC functions to output the signal input from the electronic exchanger EX to the network, and to lead the signal transferring in the network to be output to the electronic exchanger EX. The optical cross connect OXC functions to input the signal transferring in the network and send the signal to adjacent another optical cross connect.

As a result, there is provided between each of the adjacent or not adjacent two nodes, an optical signal connection. The optical signal connection will be referred to as an optical path, in the following. There is provided an optical path between the node A and the node B and another optical path between the node A and the node C, in FIG. 1. Furthermore, there is provided another optical path between a node, not shown in the drawings, and the node D. In an optical path allocated between the node A and the node D, plural user data from the node A, or more upstream node, to the node D, or more down stream node, is flowed.

In the network system shown in FIG. 1, each of the optical cross connects OXC transfers a plurality of optical signals in a single optical fiber using optical wavelength division multiplexing techniques. The optical signals are multiplexed by an optical MUX/DEMUX and an optical space-division switch OSW to be transferred in FIG. 1.

Each of the optical cross connects OXC comprises an interface IF, an optical MUX/DEMUX OMD and an optical space-division switch OSW. The data signal transferred from the electronic exchanger EX to the optical cross connect OXC is converted to an optical signal within the interface IF. The generated optical signal is provided to the optical space-division switch OSW. The optical space-division switch OSW inputs the provided optical signal to the output optical fiber directing to a desired optical cross connect.

The operation of the network system will be explained in the following. When starting the communication, each of the terminals designates a terminal to which the data is to be transferred to the electronic exchanger EX. Each of the terminals, at the same time, reports a bandwidth necessary to communicate, to the electronic exchanger EX.

In response to a call from a first terminal, the electronic exchanger EX specifies a second terminal to which the data is to be transferred. The electronic exchanger EX then judges whether the bandwidth reported by the first terminal can be provided between the first terminal and the second terminal, or not. When the electronic exchanger EX judges that the bandwidth can be provided, the electronic exchanger EX receives the call from the first terminal and starts the call process. This means that the electronic exchanger EX watches the capacity of the bandwidth of the optical path between one node and another node. Each of the electronic exchanger EX transfers the data of the call from the terminal to the network management center NMC.

As for a STM (synchronous transport module) service such as conventional telephones and N-ISDN (narrow-band integrated services digital network), bandwidth necessary for the communication is constant and bit rate is not higher than, for example, 64 kbps/channel. Therefore, by reporting the bandwidth necessary for communication before starting the communication, the reported bandwidth can be assured.

Recently however, services with which bandwidth to be used are not assured such as an available bit rate service by an ATM exchanger and an internet protocol communication service by an IP packet exchanger have been started. This means that users do not need to report or reserve bandwidth necessary for the communication to the network in these services. Furthermore, traffic drastically varies in comparison with a conventional communication.

Therefore, it is desired in these services to dynamically establish, without previously fixing, optimum optical paths in accordance with the variation of the communication bandwidth. A number of optical paths should be allocated between nodes in which heavy traffic exists.

SUMMARY OF THE INVENTION

Accordingly, it is an object of the present invention to provide a network system capable of dynamically establishing an optimum optical path in accordance with the variation of the communication bandwidth to achieve a maximum throughput.

It is another object of the present invention to provide a communication node adaptable for a network system capable of establishing an optimum optical path in accordance with the variation of the communication bandwidth.

According to the first aspect of the present invention, the network system comprises a plurality of nodes and a network management system. The nodes, and each of the nodes and the network management system are connected through optical transferring paths. Each of the nodes located in the network system comprises an optical cross connect and a packet switch. Each of the nodes accommodates a plurality of terminals.

In each of the nodes, the optical cross connect establishes an optical path through which data signal from its own node to another node is transferred and/or an optical path through which data signal from a node other than its own node to another node is transferred. Each of the nodes monitors the traffic transferring within the packet switch of its own node.

The network management system detects the variation of the communication bandwidth based on the packet flow monitored by each of the nodes. The network management system then establishes an optical path between each of the nodes to optimize the throughput of the network, based on the variation of the communication bandwidth.

According to the second aspect of the present invention, the network system comprises a plurality of nodes and a network management system. The nodes, and each of the nodes and the network management system are connected through optical transferring paths. Each of the nodes located in the network system comprises an optical cross connect and a packet switch. Each of the nodes accommodates a plurality of terminals.

Each of the nodes monitors the start and the end of an application of each of the terminals included in its own node. Each of the nodes reports the start and end of the application to the network management system.

The network management system detects the variation of the communication bandwidth based on the status of the start and the end of the application program of each of the terminals. The network management system then establishes an optical path between each of the nodes to optimize the throughput of the net based on the variation of the communication bandwidth.

According to the third aspect of the present invention, the, network system comprises a plurality of nodes and a network management system. The nodes, and each of the nodes are connected through optical transferring paths. Each of the nodes located in the network system comprises an optical cross connect and a packet switch. Each of the nodes comprises a plurality of terminals.

Each of the nodes marks a time stamp to each management packet to transfer to other nodes. Each of the nodes measures a delay time based on the time stamp when the management packet marked with the time stamp is returned from other nodes.

The network management system establishes an optical path between each of the nodes to optimize the throughput of the network system based on the delay time between each of the nodes.

DESCRIPTION OF THE PREFERRED EMBODIMENT

Figure 1:
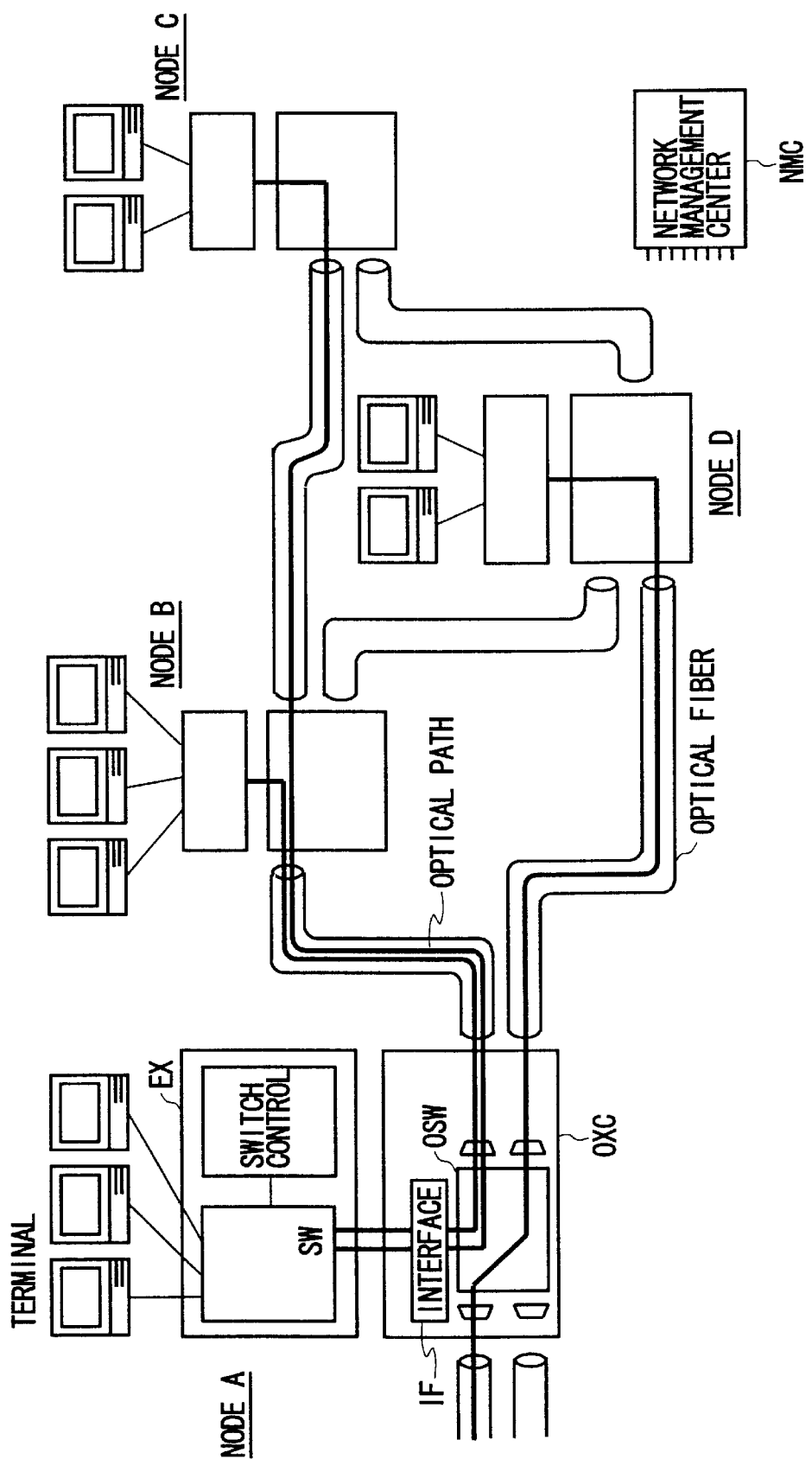
FIG. 1 shows a typical structure of the network system using the optical cross connect.
Figure 2:
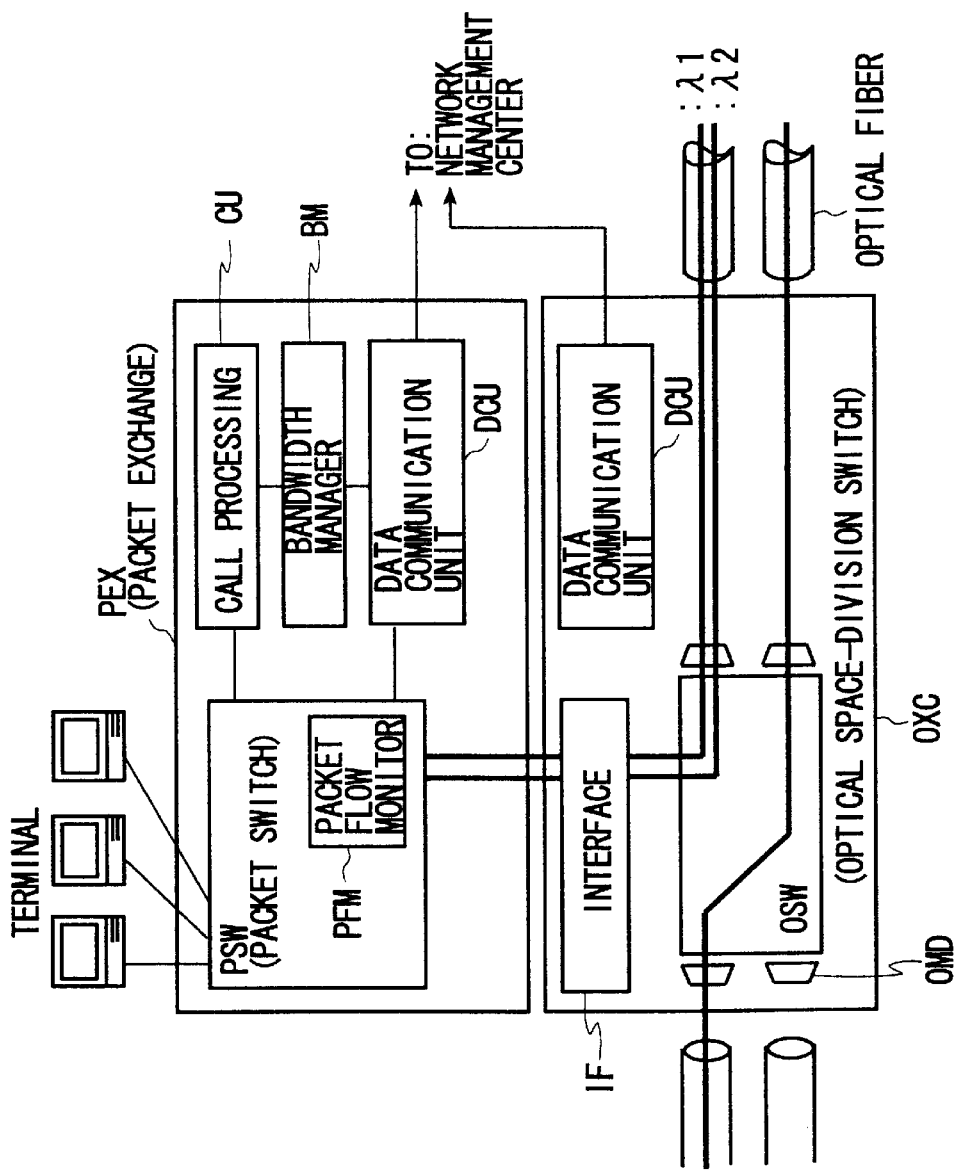
FIG. 2 is a block diagram showing the structure of the communication node located in the network according to the first embodiment.

The first embodiment of the present invention will be explained. FIG. 2 is a block diagram showing the structure of a communication node located in the network, according to the first embodiment. The node comprises a packet exchanger PEX and an optical cross connect OXC in FIG. 2.

The packet exchanger PEX comprises a packet switch PSW, a call processing unit CU, a bandwidth manager BM and a data communication unit DCU. The packet switch PSW accommodates a plurality of terminals. Each of the terminals designates to the packet exchanger PEX a terminal to communicate with when starting the communication.

In this case the packet exchanger PEX starts the communication at a predetermined fixed bandwidth even when each of the terminals does not assign the bandwidth. Of course, the packet exchanger PEX may start the communication at an assigned bandwidth when each of the terminals assigns the bandwidth. It should be noted that the bandwidth used at the start of the communication adaptively varies depending on the variation of the traffic.

The packet exchanger PEX transfers a user packet input from each of the terminals to the packet switch PSW. Alternatively, the packet exchanger PEX forwards a user packet input from the output of the optical cross connect OXC for PEX to the packet switch PSW. The packet switch PSW forwards the user packet in accordance with the destination address of the input user packet header. Thus, the user packet is transferred to an input terminal of the optical cross connect OXC, or to the terminals.

The packet switch PSW comprises a packet flow monitor PFM. The packet flow monitor PFM monitors how much traffic is transferring from which input port to which output port of the packet switch PSW. The data communication unit DCU is connected to a network management center NMC via the data communication network. The traffic monitored by the packet flow monitor PFM is reported to the network management center NMC via the data communication unit DCU.

An ATM switch can be used as the packet switch PSW. In this case, the packet exchanger PEX may comprise a call processing unit and a bandwidth manager. Because of this, a service in which the bandwidth to be used is assigned before starting the communication, such as a CBR service, can be provided at the same time as a service in which the bandwidth to be used is not assigned, such as an ABR service. An IP packet router may be used as the packet switch PSW.

The optical cross connect OXC, on the other hand, comprises an interface IF between the packet exchanger PEX and an optical space-division switch OSW. This means that the optical space-division switch OSW is connected to the packet exchanger PEX via the interface IF. The interface IF comprises an E/O (electric/optic) converter and an O/E (optic/electric) converter, neither of which are shown in the drawings. Therefore, the electrical signal input to the interface IF from the packet exchanger PEX is converted to an optical signal by the E/O converter, not shown in the drawings. The converted optical signal is input to the optical space-division switch OSW.

Alternatively, the optical signal transferred from the network to the optical cross connect OXC is input to the interface IF via the optical space-division switch OSW. The optical signal is then converted to an electrical signal by the O/E converter, not shown in the drawings, and input to the packet exchanger PEX.

The optical cross connect OXC further comprises an optical MUX/DEMUX OMD. The optical DEMUX demultiplexes an optical wavelength multiplexed signal input from the optical fiber and transfers it to the optical space-division switch OSW. The optical MUX multiplexes the wavelengths of the plurality of optical signals input from the optical space-division switch OSW and transfers it to the optical fiber. The optical space-division switch OSW leads the optical signals input from the optical MUX/DEMUX OMD or the interface IF to a desired output. The result is, the optical signal is lead to the desired output and transferred to a desired optical MUX/DEMUX OMD or to an interface IF.

It should be understood from FIG. 2 that two communication paths are provided between the packet switch PSW and the interface IF. The data transferring through these communication paths is electric/optic, converted at the interface IF and connected to the optical cross connect OXC as optical paths. It should be understood from FIG. 2 that the two optical paths output from the interface IF are input to an optical fiber via the optical cross connect OXC. The optical wavelength division multiplexing technique is used in this case. One of the two optical paths input to the same optical fiber is set using for example wavelengsh $\lambda 1$. The other of the optical paths is set using for example wavelength $\lambda 2$.

The optical space-division switch OSW does not necessarily form point to point connections between all of the optical MUX/DEMUX OMD or the interface IF with all of the optical MUX/DEMUX OMD or the interface IF. Alternately, optical cross connect OXC may be constructed with an optical ADM (optical add/drop multiplexer).

The optical cross connect OXC further comprises a data communication unit DCU. The data communication unit DCU is connected to the network management center NMC via the data communication network.

Figure 3:
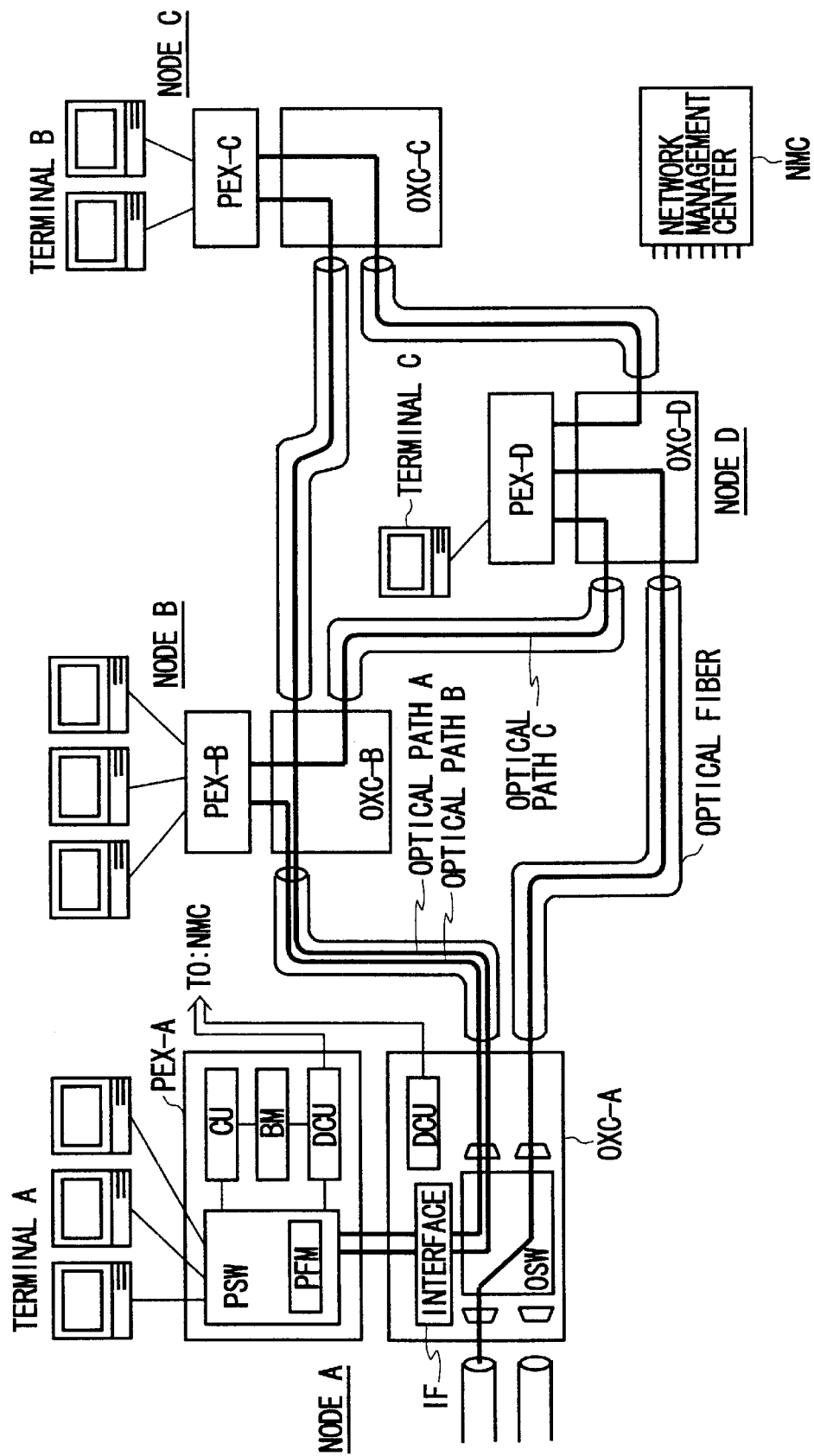
FIG. 3 shows the network according to the first embodiment.

The network as shown in FIG. 3 can be constructed by locating a plurality of nodes same as shown in FIG. 2 and connecting each of the nodes with the optical fibers. A network comprising four of the nodes shown in FIG. 2 is shown in FIG. 3. The node A comprises a packet exchanger PEX-A and an optical cross connect OXC-A in FIG. 3. Similarly, the node B, the node C and the node D respectively comprise a packet exchanger PEX-B and an optical cross connect OXC-B, a packet exchanger PEX-C and an optical cross connect OXC-C, and a packet exchanger PEX-D and an optical cross connect OXC-D. The optical path established between the node A and the node C will be referred to as an optical path A in the following. The optical path provided between the node A and the node B will be referred to as an optical path B. Furthermore, the optical path provided between the node B and the node D will be referred to as an optical path C.

Each of the nodes accommodates a plurality of terminals. As described above, these terminals are connected to the packet exchanger PEX of each of the nodes. One of the terminals accommodated in the node A will be referred to as a terminal A in the following. Similarly, one of the terminals accommodated in the node C will be referred to as a terminal B. Furthermore, one of the nodes accommodated in the node D will be referred to as a terminal C.

The operation of the network system according to the first embodiment will be explained with reference to FIG. 3. An example, in which a data is transferred from the terminal A to the terminal B will be explained.

The terminal A outputs an user packet to the packet exchanger PEX-A. Data to indicate the sender, which in this case the terminal A, and data to indicate the receiver, which in this case the terminal B, is stored in the user packet header in the user packet.

The packet exchanger PEX-A analyses the user data in the received user packet. The packet exchanger PEX-A then judges that the node C accommodates the receiver, the terminal B. The packet exchanger PEX-A judges whether an optical path is already established between its own node A and the designated node C, or not. In the network shown in FIG. 3, the optical path is already established between the node A and the node C. Therefore, the packet exchanger PEX-A transfers the user packet to the optical cross connect OXC-A. The optical cross connect OXC-A then inputs the user packet to the optical path A.

The user packet thus input to the network is transferred to the optical cross connect OXC-B through the optical path A. The user packet is cut-through in the optical cross connect OXC-B and is transferred to the optical cross connect OXC-C through the optical path A. The word "cut-through" means that an optical path is relayed as an intact optical signal through an optical cross connect OXC of an intermediate node in this application.

The data transferred in the optical path A is connected to the interface IF of the optical cross connect OXC-C. In the interface IF, the signal of the optical path A is optic/electric converted, and input to the packet exchanger PEX-C. The packet exchanger PEX-C analyses the user data in the received user packet and judges that the end receiver is the terminal B. Therefore, the packet exchanger PEX-C transfers the user packet to the terminal B.

Another example, in which a data is transferred from the terminal A to the terminal C will be explained in the following. In this case, an optical path is not established between the node A and the node D. Therefore, the user packet is transferred once from the node A to the node B, and then transferred from the node B to the node D.

This means that the terminal A outputs the user packet to the packet exchanger PEX-A. The packet exchanger PEX-A analyses the header of the received user packet and judges that the node D accommodates the end receiver, the terminal C. Therefore, the packet exchanger PEX-A outputs the user packet once through the optical path B to the node B. The optical path B is connected to the packet exchanger PEX-B in the optical cross connect OXC-B. The packet exchanger PEX-B judges that the end receiver of the user packet is the terminal C and that the node D accommodates the terminal C. Therefore, the packet exchanger PEX-B inputs the user packet to the optical path C via the optical cross connect OCX-B. The data is thus transferred from the terminal A to the terminal C.

The network management center NMC inquires to each of the packet exchangers PEX of the traffic at a predetermined interval. The inquiry is transferred from the data communication unit DCU of each of the packet exchangers PEX to the corresponding packet flow monitor PFM.

The packet flow monitor PFM calculates, for example, the traffic to be input to each of the optical paths based on the traffic monitored. Alternatively, the packet flow monitor PFM calculates the traffic to be output to a specific node regardless of the optical paths. Alternatively, the packet flow monitor PFM calculates the traffic to be input to the optical fibers connecting the node in which the packet flow monitor PFM itself is included and the adjacent nodes regardless of the optical paths.

The inquiry from the network management center NMC to each of the packet exchangers PEX, may be done by polling, for example. Then, the packet flow monitor PFM receiving the inquiry outputs the data of the calculated traffic to the network management center NMC.

The network management center NMC orders to establish a new optical path where the traffic is heavy based on the result. The network management center NMC deletes the optical path where the traffic is low. The network management center NMC therefore instructs to establish/delete the optical path to the optical cross connect OXC related to the optical path. The network management center NMC transmits the same instruction to the packet exchanger PEX.

It is assumed in the network shown in FIG. 3 that the traffic is extremely heavy between the node A and the node B. The network management center NMC should instruct the node A and the node C to delete the optical path A. As a result, the bandwidth having been used by the optical path A becomes available. Therefore, a new optical path should be established between the node A and the node B with the newly available bandwidth. As a result, two optical paths are provided between the node A and the node B, and more user packets can be transferred. However, the optical path between the node A and the node C is deleted. Therefore, in order to transfer the user packet from the node A to the node C, a new communication path should be established. For example the user packet is transferred once to the node B through the optical path B, and then transferred to the node C via the node D. As a result, the load on the packet exchanger PEX-B of the node B becomes large. It is therefore necessary for the network management center NMC to establish/delete based on a judgement of whether the action improves the throughput of the whole network or not.

Figure 4:
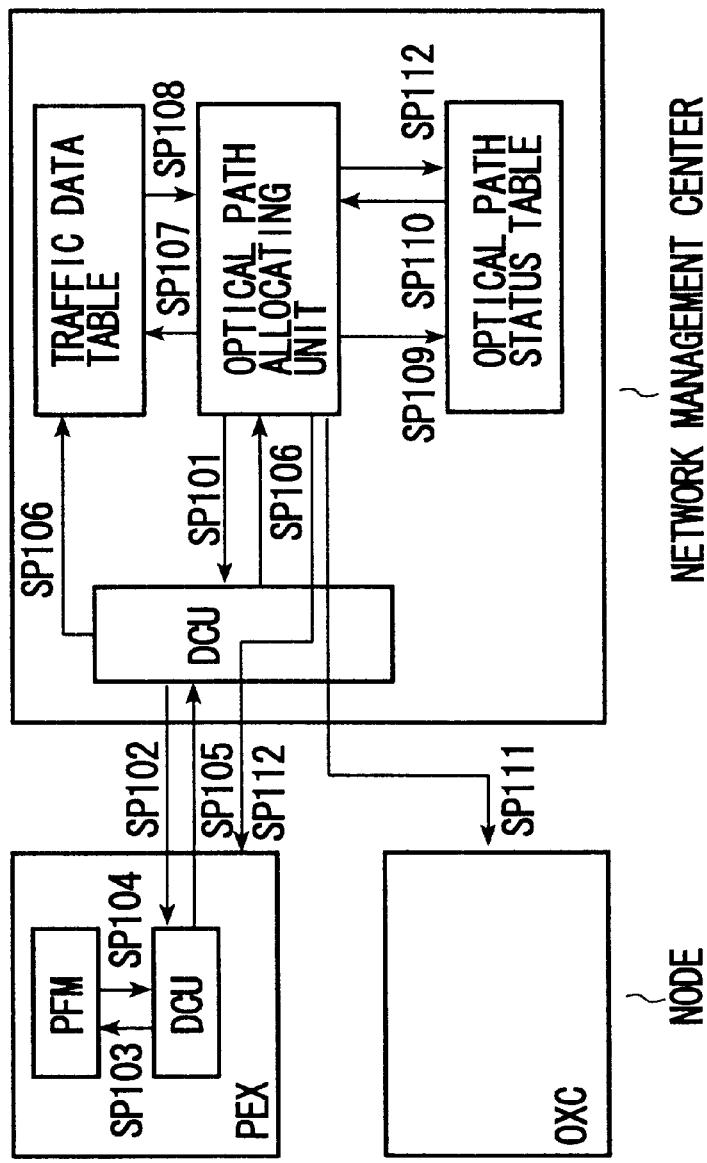
FIG. 4 shows procedures for establishing the optical path according to the first embodiment.

The procedures for establishing optical paths will be explained with reference to FIG. 4. To simplify the explanation, only the network management center NMC, one of the packet exchangers and one of the optical cross connects are shown in FIG. 4. The user packet will simply be referred to as a packet in the following.

The network management center NMC comprises a data communication unit DCU in FIG. 4. The data communication unit DCU of the network management center NMC sends the data to and receives the data from the DCU of each of the packet exchangers and the DCU of each of the optical cross connects. The network management center NMC comprises an optical path allocating algorithm. The optical path allocating algorithm includes processing procedures to establish optical paths between each of the nodes. The network management center NMC establishes/deletes optical paths based on the optical path allocating unit. The optical path allocating unit comprises an optical path allocating algorithm to establish optical paths and processing means to execute the processing procedures.

The network management center NMC further comprises a traffic data table and an optical path status table. These are stored in a semiconductor memory, for example. The packet flow input to or output from each of the packet switches and the traffic of each of the optical paths are stored and updated in the traffic data table. The number of optical paths established in the network, the route of the optical paths and the occupied bandwidth of each of the optical paths are stored in the optical path status table.

The network management center NMC inquires to the packet exchanger PEX to collect the traffic data via the data communication unit DCU (SP101 and SP102). The data communication unit DCU of the packet exchanger PEX refers to the traffic data of the packet flow monitor PFM when receiving the inquiry from the network management center NMC (SP103 and SP104). The data communication unit DCU of the packet exchanger PEX then returns the referred traffic data to the network management center NMC (SP105).

The data communication unit DCU of the network management center NMC stores the data in the traffic data table when receiving the traffic data returned from the packet exchanger PEX. The data communication unit DCU of the network management center NMC further reports to the optical path allocating unit that the traffic data table is updated (SP106).

On receiving the report, the optical path allocating unit judges, for example, to establish a new optical path where the traffic is heavy, and delete the optical path where the traffic is low. This is done by referring to the optical path status table and the traffic data table (SP107 to SP110). The optical path allocating unit then reports the determined optical path to the optical cross connect OXC in order to have the optical path established (SP111).

The optical path allocating unit updates the data of the optical path status table after establishing the optical path. At the same time, the optical path allocating unit instructs each of the packet exchangers PEX to update the optical path table of the packet exchangers PEX (SP112).

As described above, in the first embodiment communication is started even when the user does not report the bandwidth necessary for the communication. The bandwidth used at the start of the communication adaptively varies based on the variation of the traffics. Therefore, in the packet network system comprising means for providing optical paths, such as an optical cross connect and an optical ADM, using resources included in the network, an optimum optical path is dynamically established to achieve a maximum throughput.

In a typical IP network, it is difficult to assure bandwidth, to provide various service classes, and to maximize throughput cooperating with the physical layer systems. However, these functions can easily be provided according to the present invention.

The typical processing procedures to establish optical paths explained here is one example, and the scope of the invention is not limited to these procedures or the components shown in FIGS. 2 and 3.

The second embodiment of the present invention will be explained next. The operation for transferring a packet from a user terminal to another user terminal is basically same as the operation of the first embodiment. In the second embodiment, however, the procedures by which the network management center NMC obtains the packet flow transferring within the optical path are different from those of the first embodiment.

Figure 5:
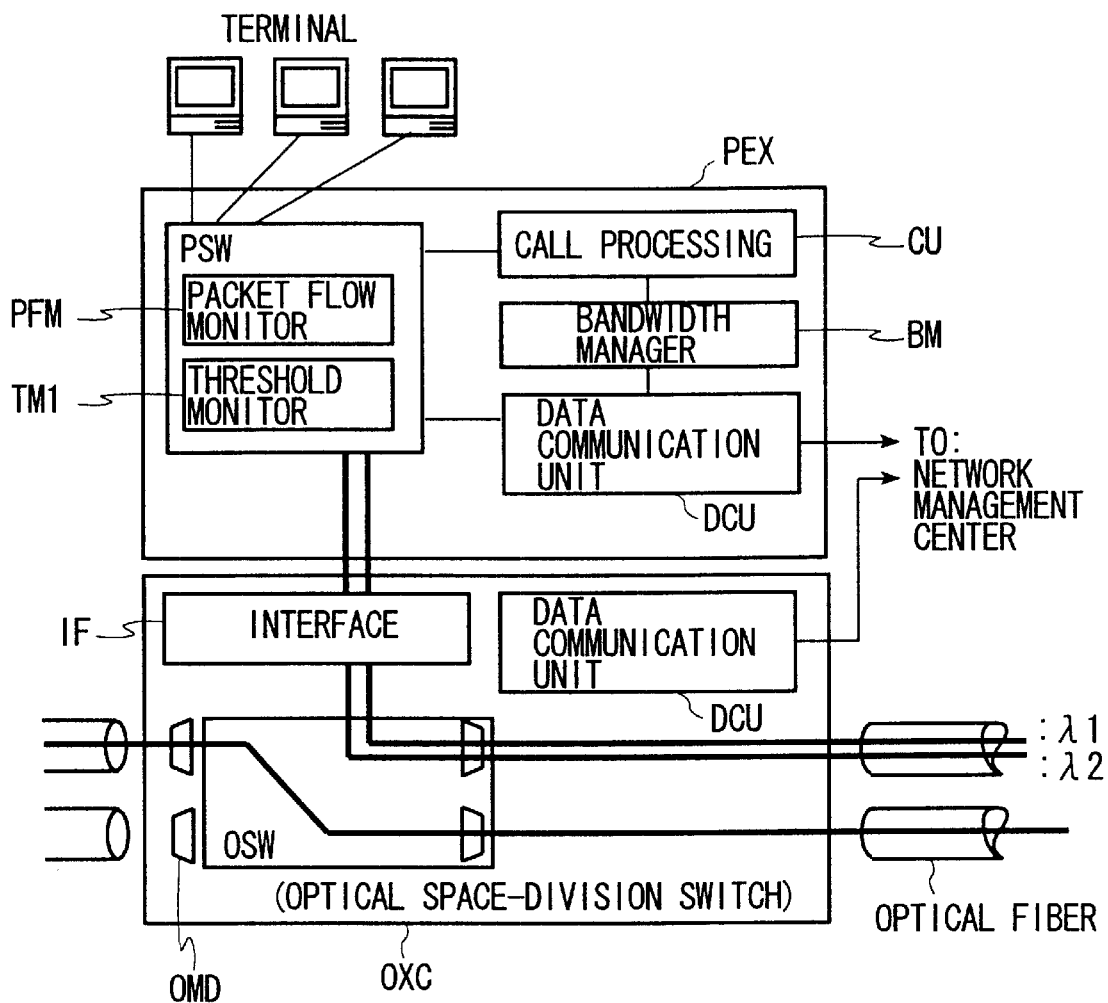
FIG. 5 is a block diagram showing the structure of the communication node located in the network according to the second embodiment.

FIG. 5 is a block diagram showing the structure of the communication node included in the network of the second embodiment. The network same as the first embodiment is constructed by locating a plurality of nodes shown in FIG. 5 and connecting each of the nodes with the optical fibers. The network of the second embodiment is basically identical to the network shown in FIG. 3. Therefore, the network of the second embodiment will not be shown in the drawings and the nodes will be explained in the following.

The node comprises a packet exchanger PEX and an optical cross connect OXC in FIG. 5. In the second embodiment, the packet exchanger PEX comprises a threshold monitor TM1 in addition to a packet flow monitor PFM. The threshold monitor TM1 is connected to the packet flow monitor PFM.

The packet flow monitor PFM calculates the traffic to be input to each of the optical paths. In the embodiments, traffic can be used as the traffic to be output to a specific node regardless of the optical paths. Alternatively, the traffic may be traffic to be input to the optical fibers connecting the node in which the packet flow monitor PFM itself is included and the adjacent nodes regardless of the optical paths.

The threshold monitor TM1 has a predetermined threshold of the traffic for each of the, optical paths. Alternatively, the threshold monitor TM1 has a predetermined threshold of the traffic to be output to a specific node regardless of the optical paths. Alternatively, the threshold monitor TM1 has a predetermined threshold of the traffic to be input to the optical fibers connecting the node in which the packet flow monitor PFM itself is included and the adjacent nodes regardless of the optical paths.

The threshold monitor TM1 compares the measured traffic with the predetermined threshold level. The predetermined threshold is determined by the network management center NMC when a new optical path is established. It is useful to set a minimum packet flow in addition to a maximum packet flow as the threshold.

The monitoring of the traffic input to the optical path will be explained in the following. When the traffic of an optical path becomes heavier than the maximum packet flow level of the optical path, the threshold monitor TM1 reports it to the network management center NMC. At the same time, the threshold monitor TM1 reports a request such as "a new optical path is necessary to be established because the traffic is too heavy" to the network management center NMC. When, on the other hand, the traffic of an optical path is less than the minimum packet flow of the optical path, the threshold monitor TM1 reports it to the network management center NMC. At the same time, the threshold monitor TM1 reports a request such as "one of the two optical paths can be deleted because the traffic is less than the predetermined threshold" to the network management center NMC.

Alternatively, the threshold monitor TM1 reports the measured packet flow itself to the network management center NMC, when the traffic of the optical path is out of the predetermined range.

This means that each of the nodes of the second embodiment autogenously monitors the packet flow. When the traffic is out of the predetermined range, each of the nodes autogenously reports it to the network management center NMC.

The network management center NMC establishes a new optical path between the nodes in response to these requests. Alternatively, the network management center NMC deletes the optical path previously established in the network. This operation is executed in the same method explained in the first embodiment.

The network management center NMC, of course, does not establish a new optical path when the bandwidth for the new optical path is not available, even when the new optical path is requested to be established. The network management center NMC, on the other hand, does not delete the optical path when there are plenty of bandwidth available, even when the optical path is requested to be deleted.

The procedures for establishing the optical path of the second embodiment will be explained with reference to FIG. 6. To simplify the explanation, only the network management center NMC, one of the packet exchangers and one of the optical cross connects are shown in FIG. 6.

Figure 6:
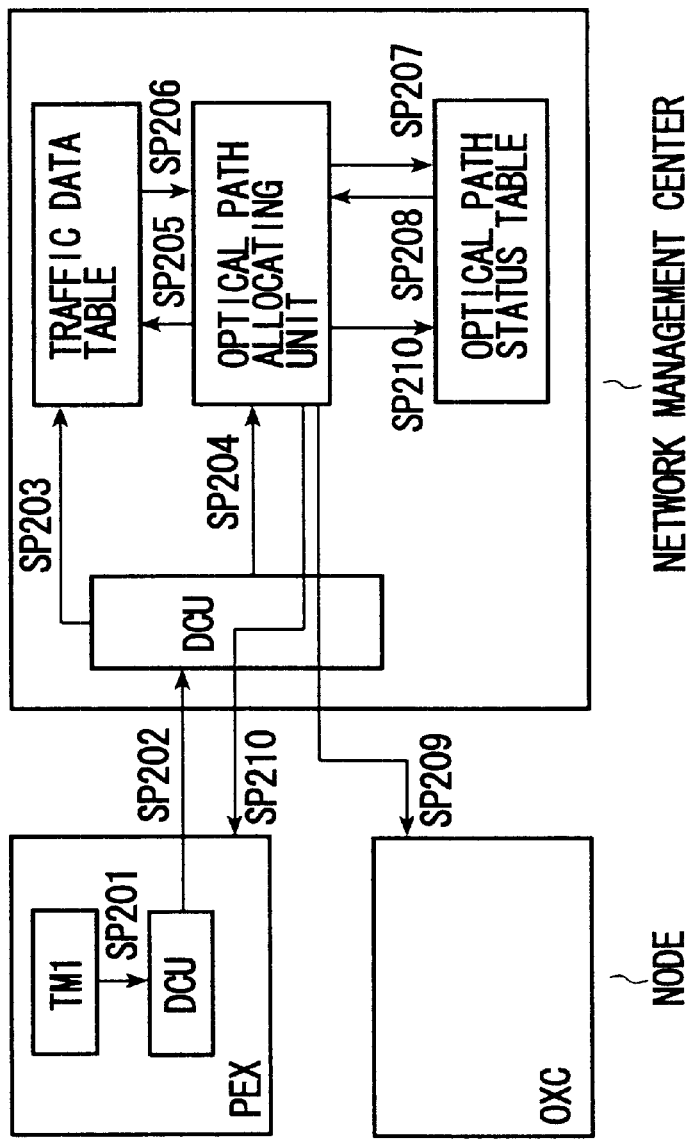
FIG. 6 shows procedures for establishing the optical path according to the second embodiment.

At the packet exchanger PEX in FIG. 6, the threshold monitor TM1 detects that the packet flow exceeds the threshold. The threshold monitor TM1 then reports it to the data communication unit DCU (SP201). On receiving the report, the data communication unit DCU of the packet exchanger PEX reports it to the data communication unit DCU of the network management center NMC (SP202).

The data communication unit DCU of the network management center NMC updates the data of the traffic data table in the network management center NMC when receiving the report from the packet exchanger PEX (SP203). The data communication unit DCU of the network management center NMC reports to the optical path allocating unit that the data of the traffic data table is updated (SP204).

On receiving the report, When the data of the traffic data table is updated, the optical path allocating unit determines a new optical path. This is done by referring to the optical path status table and the updated traffic data table (SP205 to SP208). The optical path allocating unit then judges whether to establish a new optical path where the traffic is heavy, and delete the optical path where the traffic is low by referring to the optical path status table and the traffic data table (SP205 to SP208).

The optical path allocating unit reports the determined optical path to the optical cross connect OXC in order to have the optical path established (SP209). The optical path allocating unit then updates the data of the optical path status table after establishing the new optical path. At the same time, the optical path allocating unit instructs each of the packet exchangers PEX to update the data of the optical path table of the packet exchangers PEX(SP210).

As described above, the network of the second embodiment dynamically establishes an optimum optical path in accordance with the variation of the traffic. This is same as the first embodiment.

In addition to this, each of the nodes autogenously monitors the traffic in the second embodiment. Therefore, each of the nodes does not wait inquiry from the network management center NMC, but autogenously reports the network management center NMC that the traffic exceeds the threshold. The result is, the load on the network management center NMC can be lessened. The network management center NMC can immediately start the re-allocation procedures when the traffic exceeds the predetermined threshold of one of the nodes. Therefore, quicker response is capable. However, there is a possibility that a plurality of packet exchangers PEX outputs requests to the network management center NMC at the same time, when the whole load on the network is drastically increased. Therefore, the network management center NMC is required to have enough operation capacity to response to these requests.

Figure 7:
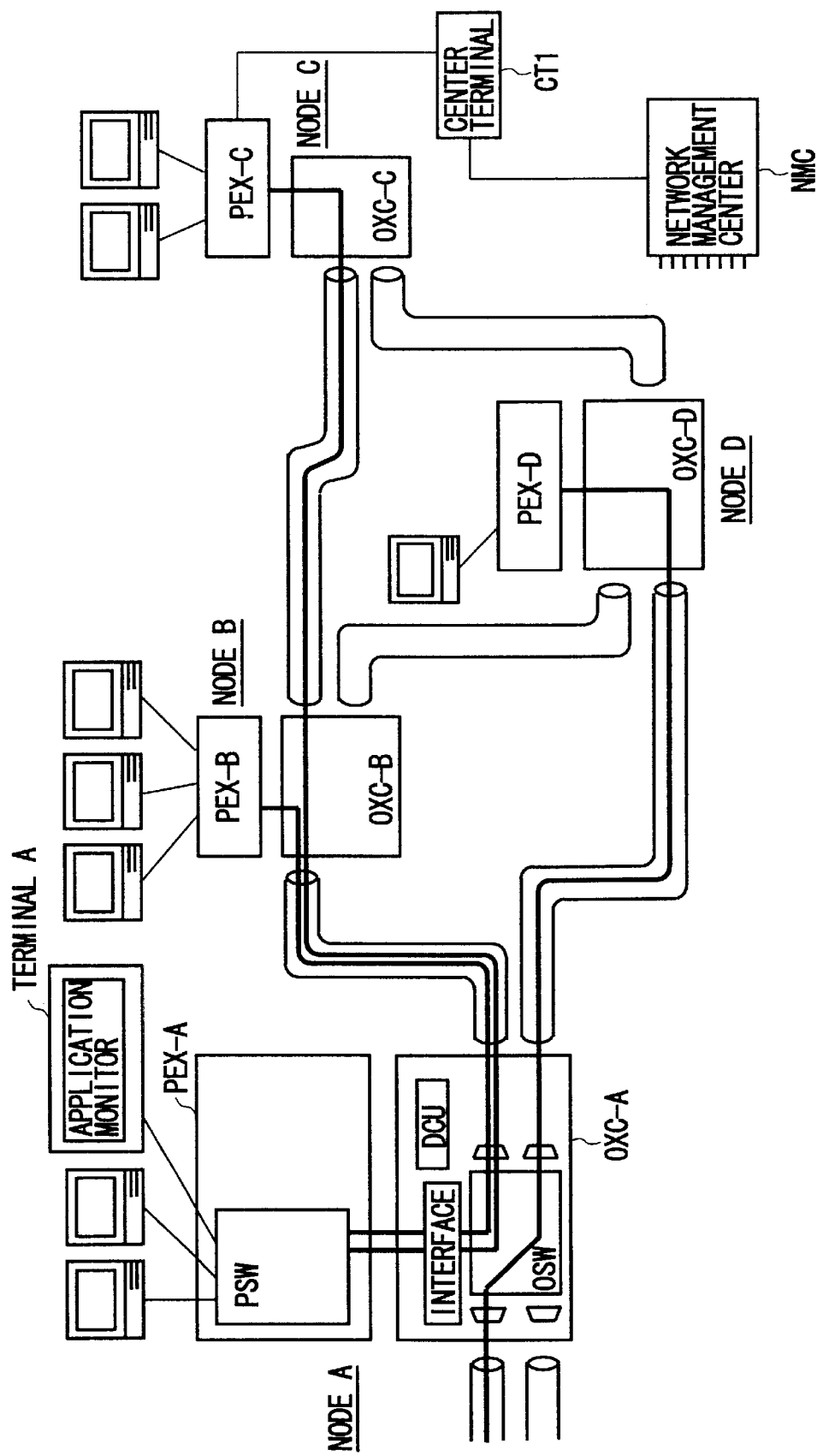
FIG. 7 is a block diagram showing the structure of the communication node located in the network according to the third embodiment.

The third embodiment of the present invention will be explained next. FIG. 7 shows the structure of the network of the third embodiment. The network shown in FIG. 7 comprises four nodes, node A to node D. In this network, a center terminal CT1 is provided. The center terminal CT1 is connected to the network management center NMC.

The center terminal CT1 communicates with all the terminals included in the network. The center terminal CT1 is thus connected with each of the nodes in the network. Although the center terminal CT1 is shown as being connected only with the node C in FIG. 7, the center terminal CT1 is capable of communicating with all of the nodes, from the node A to the node D. For example, the center terminal CT1 is capable of communicating with the packet exchanger PEX of each of the nodes. The packet exchanger PEX forwards the packets in order to connect the center terminal CT1 with each of the terminals.

Furthermore, in the third embodiment each of the terminals comprises an application monitor AM. Although only the terminal A is shown as comprising the application monitor AM in FIG. 7, the rest of the terminals also comprise the application monitor.

The operation of the third embodiment will be explained with reference to the FIGS. 7 and 8. In the third embodiment, each of the terminals typically executes a plurality of applications. Some of these applications include functions to transfer data from its own terminal to another terminal. The application monitor AM monitors the start of the application or start of the transferring of the data from such applications to another terminal. The application monitor AM also monitors the end the application or end of the transferring of the data from such applications.

This means that when an application starts or the transferring of the data to another terminal starts, the application monitor AM of the start terminal reports it to the center terminal CT1. When the application is terminated or the transferring of the data is terminated, the application monitor AM reports it to the center terminal CT1. The center terminal CT1 receives the report from each of the terminals and transfers it to the network management center NMC. The network management center NMC re-allocates the optical path when necessary. This means that the network management center NMC establishes a new optical path or deletes the optical path established previously.

The information to re-allocate the optical path is reported to each of the nodes. On receiving this report, the packet exchanger PEX and the optical cross connect OXC of each of the nodes establish the new optical path.

The procedures to establish the optical path according to the third embodiment will be explained with reference to FIG. 8. To simplify the explanation, only the network management center NMC, one of the packet exchangers and one of the optical cross connects are shown in FIG. 8.

Figure 8:
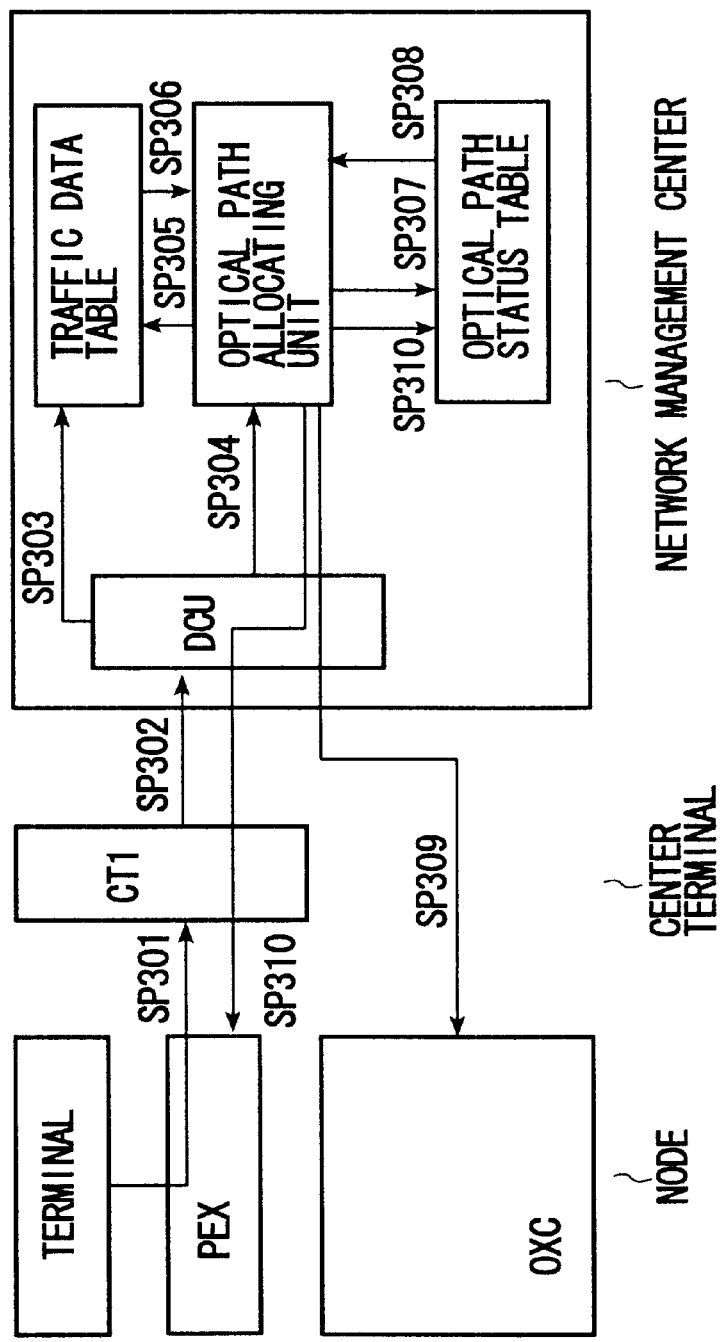
FIG. 8 shows procedures for establishing the optical path according to the third embodiment.

The application monitor AM of each of the terminals monitors the start and the end of the application of its own terminal in FIG. 8. When the application monitor AM detects the start and the end of the application, the application monitor AM reports it to the center terminal CT1 (SP301). The center terminal CT1 transfers the report to the network management center NMC (SP302).

At the network management center NMC, the data communication unit DCU receiving the report from the center terminal CT1 updates the data of the traffic data table (SP303). The data communication unit DCU of the network management center NMC reports the optical path allocating unit that the data of the traffic data table is updated (SP304).

The optical path allocating unit determines a new optical path with reference to the optical path status table and the updated traffic data table, when the traffic data table is updated (SP305 to SP308).

The optical path allocating unit reports the determined optical path to the optical cross connect OXC in order to have the new optical path established (SP309). After establishing the new optical path, the optical path allocating unit then updates the data of the optical path status table. At the same time, the optical path allocating unit instructs each of the packet exchangers PEX to update the optical path table of the packet exchangers PEX (SP310).

In the above explained procedures, each of the terminals and the network management center NMC transfer the data via the center terminal CT1. The reason for providing the center terminal CT1 is that, typically, a management device such as a network management center NMC does not usually communicate directly with terminals in networks. This means that typically a specific terminal is provided to transfer the data between the management device such as the network management center NMC and the terminals. However, the present invention is not limited to such network structure. The network management center. NMC may directly communicate with the terminals to transfer the data without providing the center terminal CT1.

Although the application monitor AM explained above is included in the terminal, the application monitor AM may be provided at other places. For example, the application monitor AM may be provided in the packet exchanger PEX.

In this case, the application monitor AM can detect the start and the end of the application by analyzing the header of the TCP/IP input from the terminal. For example, the application monitor AM can judge that a new application is started in the terminal when a packet to be transferred to a new destination which was previously not seen by analyzing the receiver shown in the header. The application monitor AM can judge that the application program is terminated in the terminal when the packet which has been transferring to one of the other terminals is not seen for a predetermined period by analyzing the receiver shown in the header.

As described above, the optical path network is optimized to achieve a maximum throughput using resources included in the network even when the user does not report the bandwidth necessary for the communication in the third embodiment as well. Furthermore, when the application monitor is provided to each of the terminals, the start and the end of the application can be detected even when the packet exchanger PEX does not comprise an application monitor. This means that a conventional packet exchanger PEX can be used.

Because of the reason that each of the nodes autogenously monitors the traffic, the load on the network management center NMC can be lessened. Therefore, quicker response is capable.

Regardless to say, the object of the re-allocation of the optical path is to optimize the traffic in the network. Therefore, the network management center NMC does not need to re-allocate the optical paths in accordance with all of the start and the end of the data communication in the terminal. For example, the network management center NMC may re-allocate the optical paths only when an application for a large data traffic communication such as a motion picture communication is started or terminated. Furthermore, the application monitor AM may report to the network management center NMC only when the application for the mass data communication is started or terminated.

As described above, the procedures for establishing a new optical path when a new application is started is explained in the third embodiment. The new optical path, however, is not occupied by the new application. For example, when an new application is started at the terminal A, and a new optical path is established, a packet output from an application executed at the terminal D can be multiplexed to be transferred in this optical path.

Figure 9:
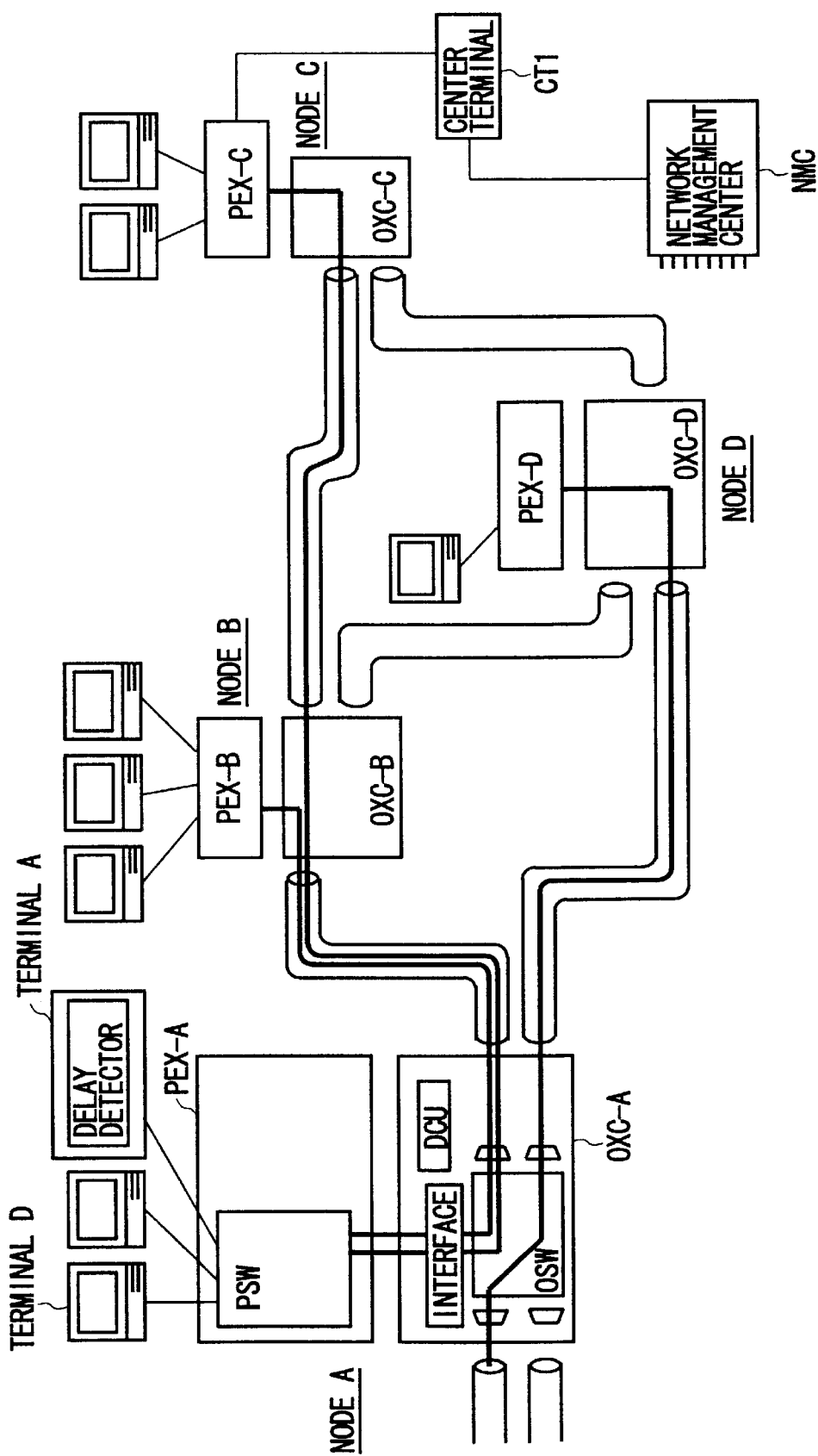
FIG. 9 is a block diagram showing the structure of the communication node located in the network according to the fourth embodiment.

The fourth embodiment of the present invention will be explained next. FIG. 9 shows the structure of the network of the fourth embodiment. The network of the fourth embodiment has the same structure as that of the third embodiment. This means that the network of the fourth embodiment comprises four nodes, node A to node D. The network further comprises a center terminal CT1 and a network management center NMC.

In the fourth embodiment, at least one of the terminals connected to each of the nodes comprises a delay detector DD. Although only the node A is shown as comprising the delay detector DD in FIG. 9, the rest of the nodes comprise at least a delay detector DD.

The center terminal CT1 communicates with all of the terminals included in the network. The center terminal CT1 is thus connected with each of the nodes included in the network. Although the center terminal CT1 is shown as being connected with the node C in FIG. 9, the center terminal CT1 is capable of communicating with all of the nodes from the node A to the node D. For example, the center terminal CT1 is capable of communicating with the packet exchanger PEX of each of the nodes. The packet exchanger forwards the packets in order to connect the center terminal CT1 with each of the terminals.

All the delay detector DD in the network works in accordance with the synchronized clock. Each of the delay detectors DD has a function to output a managing packet to the delay detector DD included in other nodes. In addition, each of the delay detectors DD has a function to return the managing packet transferred from another delay detector DD to that original delay detector DD. Each of the delay detectors DD writes the output time on the managing packet when outputting the managing packet or when returning the managing packet transferred from another delay detector DD. Furthermore, each of the delay time detectors DD has a function to write the output time on the managing packet, even if the managing packet is merely cut through the node.

As a result, the original delay detector DD can recognize three kinds of the times including the time when the managing packet is output by the original delay detector, the time when the managing detector is returned by another delay detector DD and the time when the managing packet is received by the original delay detector DD, when the original delay detector DD receives the managing packet output therefrom.

The original delay detector DD can obtain a one way delay time required to be transferred to another delay detector DD, a return way delay time required to be returned from another delay detector DD to the original delay detector DD, and a two way delay time required to be returned to the original delay detector DD via another delay detector DD from these three kinds of the times. Furthermore, the original delay detector DD can obtain a deley between the relay nodes related to the optical path. These functions can be executed by the functions such as a "Ping" command, and a "Trace Route" command between the computer communications.

The operation of the fourth embodiment will be explained with reference to FIGS. 9 and 10. In the fourth embodiment, each of the delay detectors DD outputs a managing packet to another delay detector DD included in another node at a predetermined interval. The other delay detector DD receiving the managing packet returns the managing packet to the original delay detector DD.

The original delay detector DD can obtain the delay time required to be returned thereto from the output times written on the managing packet. It means that the two way delay time required for the managing packet to transferred from the node of the original delay detector DD to the other node and returned to the node of the original delay detector DD through fibers and relay packet exchangers PEX.

Each of the delay detectors DD obtains the delay time for each of the optical paths established in the network and time for waiting in relay packet exchangers PEX. Then, each of the delay detector DD stores the value for each of the optical paths in a memory, for example. Each of the delay detectors DD reports the stored delay times to the network management center NMC when the network management center NMC instructs to do so.

Typically, when there are too heavy traffic in the packet exchanger PEX-A to the packet exchanger PEX-D located in the network, the delay time becomes large. On the other hand, when there are not too heavy traffic on the network, the delay time becomes small.

The network management center NMC inquires to each of the delay detectors DD in the network of the delay time measured by the delay detector DD at a predetermined interval. The inquiry is done by polling, for example. Each of the delay detectors DD outputs the stored delay time in response to this inquiry. The network management center NMC re-allocates optical paths in accordance with the delay times reported by each of the delay detectors DD.

The procedures to establish the optical path according to the fourth embodiment will be explained with reference to FIG. 10. To simplify the explanation, only the network management center NMC, one of the packet exchangers and one of the optical cross connects are shown in FIG. 10.

Figure 10:
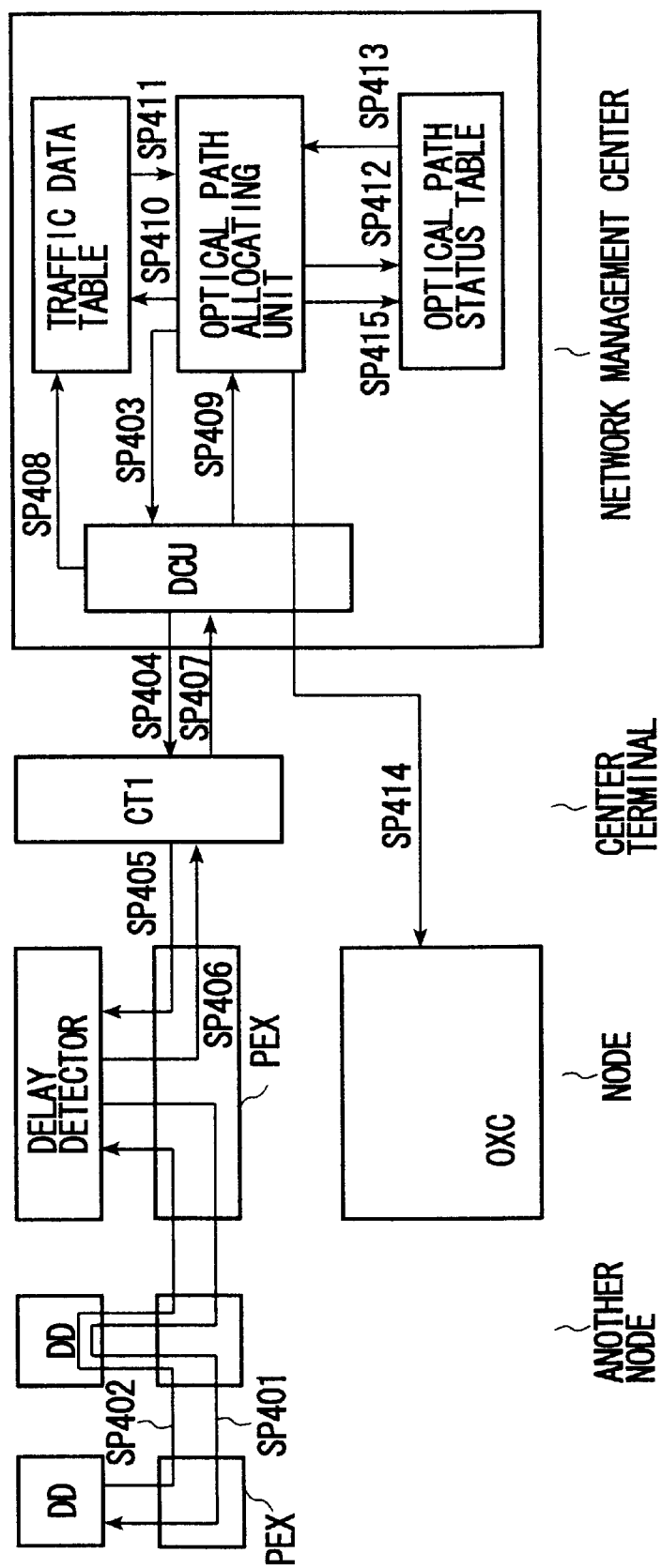
FIG. 10 shows procedures for establishing the optical path according to the fourth embodiment.

The delay detector DD measures the delay time for each paths in FIG. 10 (SP401 and SP402).

The network management center NMC inquires to the delay detector DD of the delay time via the data communication unit DCU and the center terminal CT1 (SP403, SP404, and SP405).

The delay detector DD reports the stored delay time to the network management center NMC via the center terminal CT1 (SP406) in response to the inquiry from the network management center NMC (SP407).

The data communication unit DCU of the network management center NMC stores the delay time reported by the delay detector DD in the traffic data table (SP408). The data communication unit DCU of the network management center NMC further reports to the optical path allocating unit that the traffic data table is updated (SP409).

On receiving the report, the optical path allocating unit determines a new optical path with reference to the optical path status table and the traffic data table (SP410 to SP413). Optical path allocating unit further reports the optical path to the optical cross connect OXC in order to have the new optical path established (SP414). At the same time, the data of the optical path status table is updated (SP415).

The network management center NMC of the fourth embodiment may directly communicate with the terminals without providing the center terminal CT1.

Furthermore, the delay detector DD may be provided at other places. The delay detector DD may be, for example, provided in the packet exchanger PEX. In this case, for example, (a) the terminal generates the managing packet and sends it to another terminal provided in another node. The delay detector DD provided in the packet exchanger PEX can monitor that the managing packet passes through the packet switch and mark a time stamp to the managing packet. Alternatively, (b) the delay detector DD provided in the packet exchanger PEX may generate a managing packet and send it to another delay detector of a packet exchanger PEX provided at another node.

As described above, the optical path network is optimized to achieve a maximum throughput using resources included in the network even when the user does not report the bandwidth necessary for the communication in the fourth embodiment as well. A conventional packet exchanger PEX can be used when the delay detector is provided to each of the terminals.

When the delay monitor is provided in the terminal in the fourth embodiment, a delay monitor may be provided in at least one terminal for each of the nodes. Therefore, the construction of the network is very easy. The terminal to which the delay monitor is provided is prepared by a manager (for example, a communication manager) of the node. Alternatively, the delay monitor can be provided at the terminal of the user included in the node.

Figure 11:
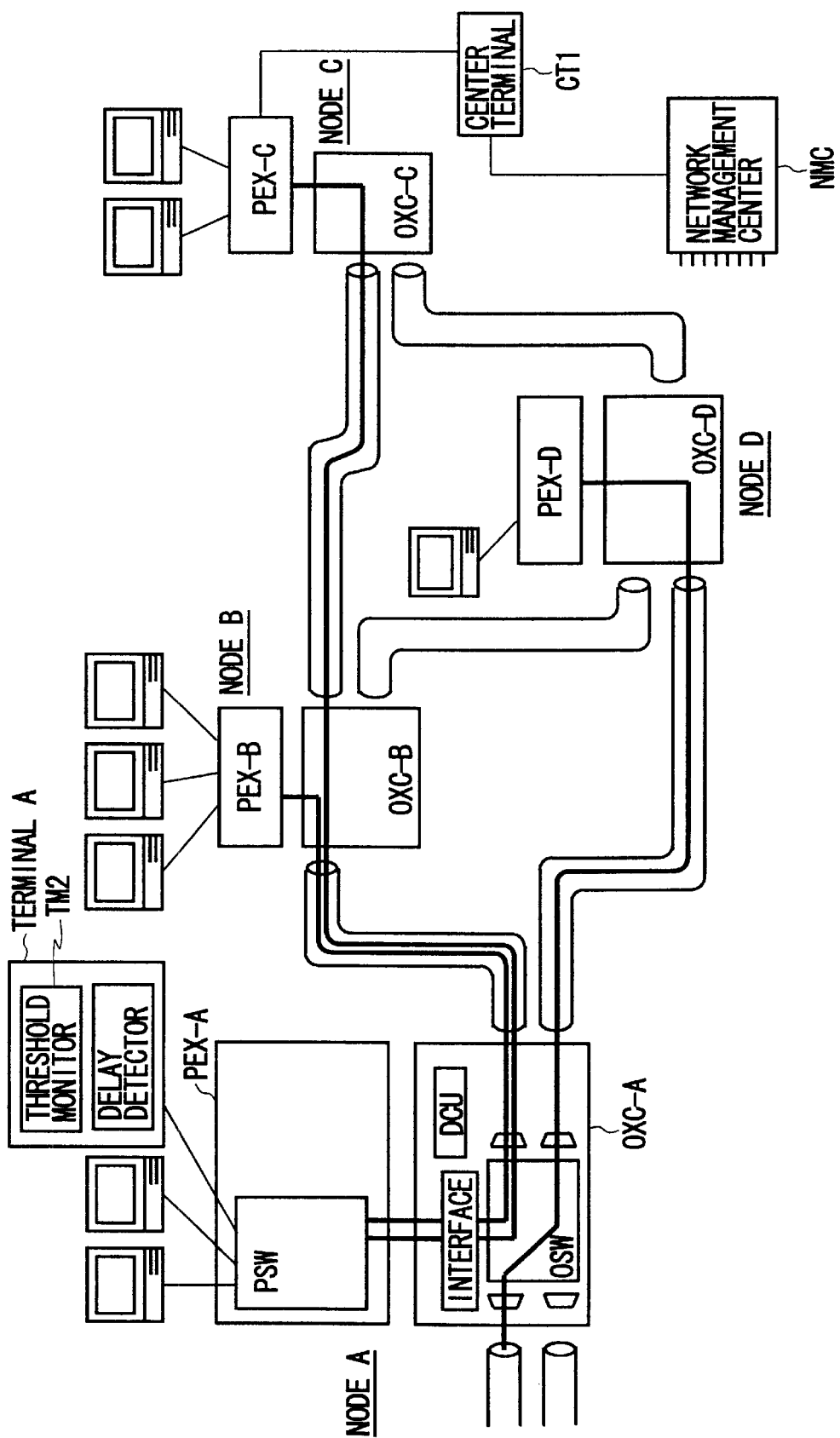
FIG. 11 is a block diagram showing the structure of the communication node located in the network according to the fifth embodiment.

The fifth embodiment of the present invention will be explained next. FIG. 11 shows the structure of the network of the fifth embodiment. The network of the fifth embodiment has the same structure as that of the third or the fourth embodiment. The network comprises four nodes, node A to node D. The network further comprises a center terminal CT1 and a network management center NMC.

In the fifth embodiment, at least one of the terminals connected to each of the nodes comprises a delay detector DD and a threshold monitor TM2. Although only the terminal A connected to the node A is shown as comprising the delay detector DD and the threshold monitor TM in FIG. 11, the rest of the nodes comprise at least one delay detector DD and one threshold monitor TM.

The center terminal CT1 communicates with all of the terminals in the network. The center terminal CT1 is thus connected with each of the nodes in the network. Although the center terminal CT1 is shown as being only connected with the node C in FIG. 11*, actually, the center terminal CT1 is capable of communicating with all of the nodes from the node A to the node D. For example, the center terminal CT1 is capable of communicating with the packet exchanger PEX of each of the nodes. The packet exchanger PEX forwards the packet in order to connect the center terminal CT1 with each of the terminals.

Each of the delay detectors DD outputs a managing packet to another delay detector DD at a predetermined interval in fifth embodiment as well. The delay detector receiving the managing packet returns the managing packet to the original delay detector DD. The original delay detector DD measures the delay time required for the managing packet to be returned thereto from the output time written on the managing packet.

Each of the delay detectors DD obtains the delay time for each of the optical paths established in the network. Then, each of the delay detectors DD reports the value of each of the paths to the threshold monitor TM2.

The threshold monitor TM2 basically functions as same as that of the second embodiment. This means that the threshold monitor TM2 compares the value of the delay time with the threshold predetermined for each of the paths. The threshold is determined by the network management center NMC when a new path is established. It is useful to determine a minimum value in addition to a maximum value of the delay time as the threshold.

When the delay time of an optical path exceeds the maximum value, the threshold monitor TM2 reports it to the network management center NMC. At the same time, the threshold monitor TM2 sends a report such as "there is heavy traffic on the optical path" to the network management center NMC. With this report, the threshold monitor TM2 may request the re-allocation of the optical path to the network management center NMC. When the delay time of an optical path becomes smaller than the minimum value, the threshold monitor TM2 reports in to the network management center NMC. At the same time, the threshold monitor TM2 reports a request such as "some of the optical paths maybe deleted because the traffic in the optical paths is not heavy" to the network management center NMC.

Alternatively, the threshold monitor TM2 reports the measured threshold itself to the network management center NMC when the delay time of an optical path becomes out of the predetermined value.

This means that the terminal comprising the delay detector DD and the threshold monitor TM2 autogenously monitors the delay time in the fifth embodiment. When the delay time becomes out of the predetermined value, the terminal then autogenously reports it to the network management center NMC.

The network management center NMC establishes a new optical path in response to these requests. Alternatively, the network management center NMC deletes the optical path previously established. This operation is similarly executed as described in the first embodiment.

The procedures for establishing the optical paths of the fifth embodiment will be explained with reference to FIG. 12. To simplify the explanation, only the network management center NMC, one of the packet exchangers and one of the optical cross connects is shown in FIG. 12.

Figure 12:
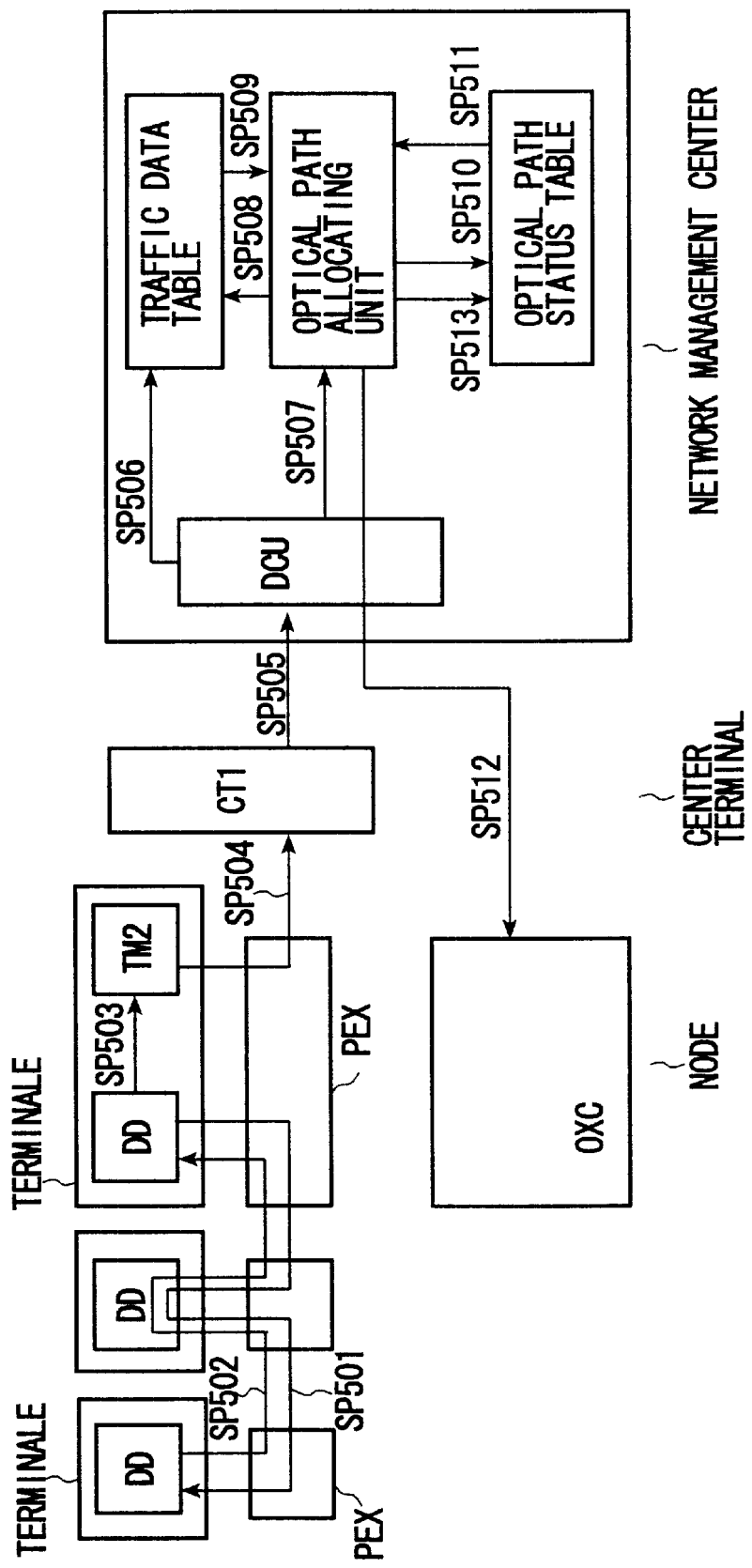
FIG. 12 shows procedures for establishing the optical path according to the fifth embodiment.

The delay detector DD measures the delay time for each paths (SP501 and SP502) in FIG. 12. The delay time is reported to the threshold monitor TM2 (SP503).

When the threshold monitor TM2 judges that the received delay time exceeds the threshold, the threshold monitor TM2 reports it to center terminal CT1 (SP504). The center terminal CT1 transfers this report to the network management center NMC (SP505).

The data communication unit DCU of the network management center NMC stores the delay time reported by the threshold monitor TM2 in the traffic data table (SP506). The data communication unit DCU of the network management center NMC further reports to the optical path allocating unit that the traffic data table is updated (SP507).

On receiving the report, the optical path allocating unit determines a new optical path with reference to the optical path status table and the traffic data table (SP508 to SP511). The optical path allocating unit further reports the optical path to the optical cross connect OXC in order to have the optical path established (SP512). At the same time, the optical path allocating unit updates the data of the optical path status table (SP513).

The network management center NMC of this fifth embodiment may directly communicate with terminals without providing the center terminal CT1. Furthermore, the delay detector and the threshold monitor may be provided, for example, in the packet exchanger PEX as same as those of the fourth embodiment.

As described above, the optical path network is optimized to achieve a maximum throughput using resources included in the network even when the user does not report the bandwidth necessary for the communication in the fifth embodiment as well. In addition to this, because of the reason that the status of the network is reported more quickly to the network management center NMC in the fifth embodiment, the optical paths can be re-allocated more quickly.

In the drawings of the above described embodiments, the network management center NMC is shown as being apart from each of the nodes. Furthermore, the data communication network connecting the network management center NMC and each of the nodes is shown as different line from the optical path in which the user packet is transferred. However, some of the nodes may comprise the function of the network management center NMC. The data communication network may be constructed using the optical path in which the user packet is transferred.

This invention can be applied to a network in which each of the terminals needs to report the bandwidth necessary when starting the communication. In such network, each of the nodes can calculate the sum value of the bandwidth reported by each of the terminals. Then, each of the nodes autogenously reports to the network management center in response to the inquiry from the network management center or when the calculated value exceeds a predetermined threshold. The network management center may dynamically allocate optical paths in accordance with the report.

What is claimed is:

1. A network system including a plurality of nodes and at least a network management system, an optical path being established between two of the plurality of nodes, wherein:
   the network system comprises a monitor associated with each node for monitoring a packet flow of the optical path as an electrical signal; and
   an additional optical path between the nodes is established based on the packet flow monitored by the monitor.

2. A network system as set forth in claim 1, wherein:
   the network system comprises a threshold monitor having a threshold of a packet flow predetermined for each path; and
   the additional optical path between the nodes is established when the packet flow is judged to exceed the threshold.

3. A network system as set forth in claim 1, wherein:
   the network system comprises a threshold monitor having a threshold of a packet flow to be output to a specific node; and
   the additional optical path between the nodes is established when the packet flow is judged to exceed the threshold.

4. A network system as set forth in claim 1, wherein:
   the network system comprises a threshold monitor having a threshold of a packet flow transferring in a communication path between one of the nodes and the nodes adjacent to the one of the nodes; and
   the additional optical path between the nodes is established when the packet flow is judged to exceed the threshold.

5. A network system including a plurality of nodes and at least a network management system, an optical path being established between two of the plurality of nodes, wherein:
   the network system comprises an application monitor associated with each node for monitoring as an electrical signal a start and end of an application at the nodes; and
   an additional optical path between the nodes is established based on a status of the application.

6. A network system including a plurality of nodes and at least a network management system, an optical path being established between two of the plurality of nodes, wherein:
   the network system comprises means for measuring a delay time generated between one of the plurality of nodes and the other one of the nodes, the delay time being measured as an electrical signal at each node; and
   an additional optical path between the nodes is established based on the delay time.

7. A network system as set forth in claim 6, wherein:
   the network system comprises a threshold monitor having a threshold of a delay time predetermined for each path; and
   the additional optical path between the nodes is established when the delay time is judged to exceed the threshold.

8. A network system as set forth in claim 6, wherein:
   the network system comprises a threshold monitor having a threshold of a delay time predetermined for each connection between the nodes; and
   the additional optical path between the nodes is established when the delay time is judged to exceed the threshold.

9. A network system including a plurality of nodes and at least a network management system, an optical path being established between two of the plurality of nodes, wherein:
   each node comprises a packet switch comprising a plurality of terminals, an optical cross connect, and a monitor for monitoring a data packet flow in the optical path as an electrical signal; and
   an additional optical path between the nodes is established based on the packet flow monitored by the monitor in the network system.

10. A network system as set forth in claim 9, wherein:
    the network management system comprises means for inquiring the data packet flow in the optical path to the monitor;
    the monitor comprises means for reporting the data packet flow in the optical path to the network management system in response to the inquiry; and
    the network management system establishes the additional optical path between the nodes based on the packet flow.

11. A network system as set forth in claim 9, wherein:
    the nodes comprises a threshold monitor having a threshold of a packet flow predetermined for each path; and
    the network management system establishes the additional optical path between the nodes when the packet flow is judged to exceed the threshold.

12. A network system as set forth in claim 9, wherein:
    the node comprises a threshold monitor having a threshold of a traffic to be output to a specific node; and
    the network management system establishes the additional optical path between the nodes when the traffic is judged to exceed the threshold.

13. A network system as set forth in claim 9, wherein:
    the node comprises a threshold monitor having a threshold of a traffic transferring in a communication path between one of the nodes and the nodes adjacent to the one of the nodes; and
    the network management system establishes the additional optical path between the nodes when the traffic is judged to exceed the threshold.

14. A network system as set forth in claim 11, wherein:
    the threshold monitor comprises means for reporting to the network management system when the packet flow is judged to exceed the threshold; and
    the network management system establishes the additional optical path between the nodes based on the report from the threshold monitor.

15. A network system including a plurality of nodes and at least a network management system, an optical path being established between two of the plurality of nodes, wherein:
    each node comprises a packet switch comprising a plurality of terminals, an optical cross connect, and an application monitor for monitoring as an electrical signal a status of an application at the terminals; and the network system establishes the additional optical path between the nodes based on a status of the application.

16. A network system as set forth in claim 15, wherein: the application monitor is provided in the terminals.

17. A network system as set forth in claim 15, wherein: the application monitor reports a status of the application to the network management system; and the network management system establishes the additional optical path between the nodes based on the report from the application monitor.

18. A network system including a plurality of nodes and at least a network management system, an optical path being established between two of the plurality of nodes, wherein:

each node comprises a packet switch comprising a plurality of terminals, an optical cross connect, and a delay monitor for measuring as an electrical signal a delay time between the nodes; and the network system establishes an additional optical path between the nodes based on the delay time.

19. A network system as set forth in claim 18, wherein: the delay monitor measures the delay time by sending to and receiving from the other of the nodes a managing packet having time data.

20. A network system as set forth in claim 19, wherein: the network management system comprises means for inquiring the delay time to the delay monitor;

the delay monitor comprises means for reporting the delay time to the network management system in response to the inquiry; and the network management system establishes the additional optical path between the nodes based on the delay time.

21. A network system as set forth in claim 18, wherein: the node comprises a threshold monitor having a threshold of a delay time for each path; and the network management system establishes the additional optical path between the nodes when the delay time is judged to the threshold.

22. A network system as set forth in claim 18, wherein: the node comprises a threshold monitor having a threshold of a delay time of a traffic to be output to a specific node;

the network management system establishes the additional optical path between the nodes when the delay time is judged to exceed the threshold.

23. A network system as set forth in claim 18, wherein: the node comprises a threshold monitor having a threshold of a traffic transferring in a communication path between one of the nodes and the nodes adjacent to the one of the nodes; and the network management system establishes the additional optical path between the nodes when the delay time is judged to exceed the threshold.

24. A network system as set forth in one of claim 21, wherein:

the delay monitor measures the delay time by sending to and receiving from the other of the nodes a management packet having time data.

25. A network system as set forth in claim 21, wherein: the threshold monitor comprises means for reporting to the network management system when the packet flow is judged to exceed the threshold; and the network management system establishes the additional optical path between the nodes based on the report from the threshold monitor.

26. A network system as set forth in claim 22, wherein: the threshold monitor comprises means for reporting to the network management system when the packet flow is judged to exceed the threshold; and the network management system establishes the additional optical path between the nodes based on the report from the threshold monitor.

27. A network system as set forth in claim 23, wherein: the threshold monitor comprises means for reporting to the network management system when the packet flow is judged to exceed the threshold; and the network management system establishes the additional optical path between the nodes based on the report from the threshold monitor.

28. A network system as set forth in claim 22, wherein: the delay monitor measures the delay time by sending to and receiving from the other of the nodes a managing packet having time data.

29. A network system as set forth in claim 23, wherein: the delay monitor measures the delay time by sending to and receiving from the other of the nodes a managing packet having time data.

30. A network system as set forth in claim 22, wherein: the threshold monitor comprises means for reporting to the network management system when the packet flow is judged to exceed the threshold; and the network management system establishes the additional optical path between the nodes based on the report from the threshold monitor.

31. A network system as set forth in claim 23, wherein: the threshold monitor comprises means for reporting to the network management system when the packet flow is judged to exceed the threshold; and the network management system establishes the additional optical path between the nodes based on the report from the threshold monitor.

32. A network system as set forth in claim 1, wherein the network management system comprises an optical path status table storing a number of optical paths, a route of each optical path, and an occupied bandwidth of each optical path.

33. A network system as set forth in claim 5, wherein the network management system comprises an optical path status table storing a number of optical paths, a route of each optical path, and an occupied bandwidth of each optical path.

34. A network system as set forth in claim 6, wherein the network management system comprises an optical path status table storing a number of optical paths, a route of each optical path, and an occupied bandwidth of each optical path.

35. A network system as set forth in claim 9, wherein the network management system comprises an optical path status table storing a number of optical paths, a route of each optical path, and an occupied bandwidth of each optical path.

36. A network system as set forth in claim 15, wherein the network management system comprises an optical path status table storing a number of optical paths, a route of each optical path, and an occupied bandwidth of each optical path.

37. A network system as set forth in claim 18, wherein the network management system comprises an optical path status table storing a number of optical paths, a route of each optical path, and an occupied bandwidth of each optical path.

* * * * *